United States Patent [19]

Söderholm et al.

[11] Patent Number: 5,376,950
[45] Date of Patent: Dec. 27, 1994

[54] CONVEYOR BELT WITH COMBINED BELT GUIDE AND BELT DRIVE ROLLINGLY ENGAGING BELT ON HORIZONTAL CARRYING RUN, BETWEEN LOADING STATION AND WEIGHING STATION

[75] Inventors: Olof Söderholm; Arne Söderholm, both of Bromma, Sweden

[73] Assignee: S.E.G. Mekanik AB, Åmål, Sweden

[21] Appl. No.: 779,283

[22] Filed: Oct. 18, 1991

[30] Foreign Application Priority Data

Oct. 18, 1990 [SE] Sweden .................. 9003335-8

[51] Int. Cl.⁵ .................. G01G 11/14; G01G 13/02; B65G 23/06
[52] U.S. Cl. .................. 346/16; 346/119; 198/834
[58] Field of Search .................. 198/834; 177/16, 119

[56] References Cited

U.S. PATENT DOCUMENTS

| | | |
|---|---|---|
| 271,678 | 2/1883 | Atwood .................. 198/834 |
| 1,927,461 | 9/1933 | Lindgreen .................. 198/834 |
| 2,540,862 | 2/1951 | Buser .................. 198/834 |
| 3,324,960 | 6/1967 | Bauer et al. .................. 177/16 |
| 3,387,675 | 6/1968 | MacFarlane .................. 177/16 |
| 3,439,761 | 4/1969 | Laimins .................. 177/16 |
| 3,478,830 | 11/1969 | Levesque et al. .................. 177/16 |
| 3,718,197 | 2/1973 | Barten et al. .................. 177/16 |
| 3,917,092 | 11/1975 | McGinnis .................. 198/834 X |
| 4,133,455 | 1/1979 | Moser .................. 177/16 X |
| 4,418,773 | 12/1983 | Finet et al. .................. 177/16 |
| 4,747,747 | 5/1988 | Fusco et al. .................. 198/834 X |
| 4,844,238 | 7/1989 | Lachner .................. 198/834 X |
| 4,884,393 | 12/1989 | Hilleby .................. 198/834 X |
| 5,044,819 | 9/1991 | Kilheffer .................. 177/119 X |

Primary Examiner—Benjamin R. Fuller
Assistant Examiner—Randy W. Gibson
Attorney, Agent, or Firm—Cushman Darby & Cushman

[57] ABSTRACT

A metering belt feeder for gravimetrically measuring a flow of material with the aid of an endless belt which includes a loading zone (10), a weighing zone (10) and a belt drive which is located between these two zones. The belt is caused to move in a plane above both the loading zone and the weighing zone. The belt drive means is constructed so as to draw the belt from the loading zone in the absence of belt-slipping and to project the belt over the weighing zone, and also so as to guide the belt against sideways movement.

15 Claims, 2 Drawing Sheets

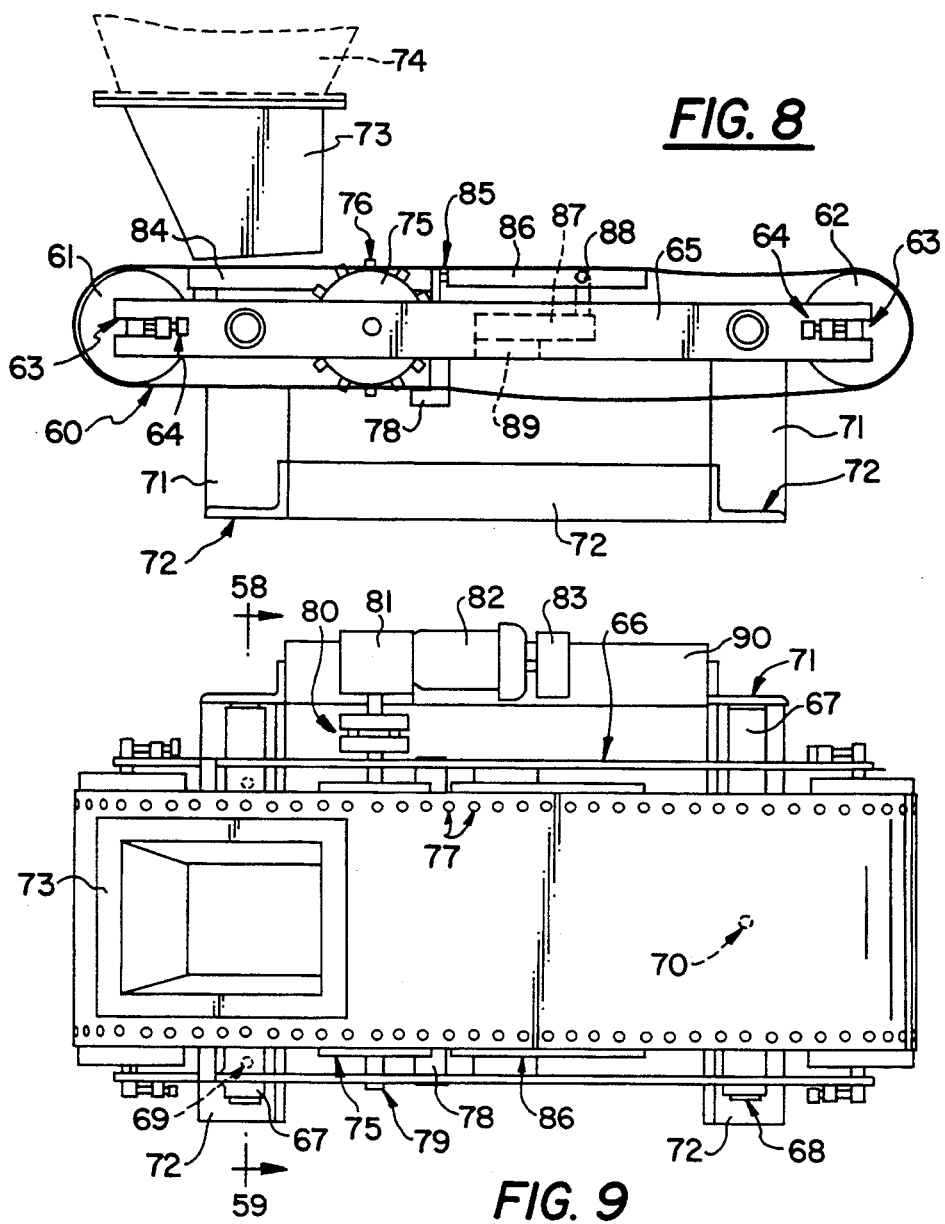
FIG. 8
FIG. 9
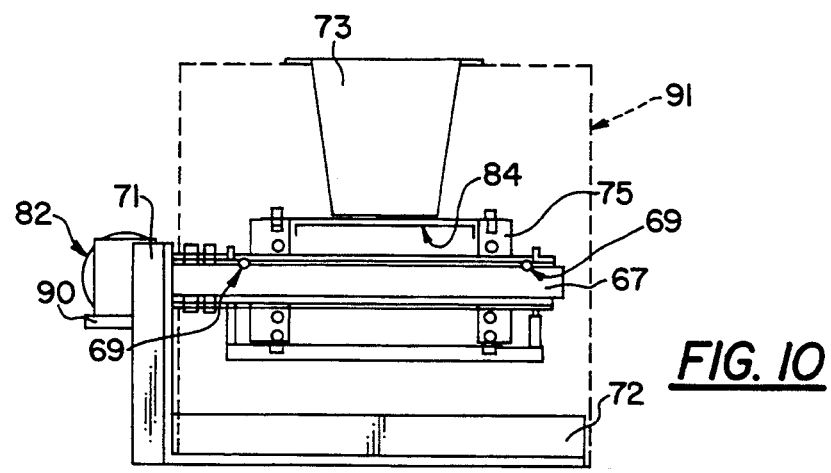
FIG. 10

CONVEYOR BELT WITH COMBINED BELT GUIDE AND BELT DRIVE ROLLINGLY ENGAGING BELT ON HORIZONTAL CARRYING RUN, BETWEEN LOADING STATION AND WEIGHING STATION

BACKGROUND OF THE INVENTION

The present invention relates to apparatus for producing a specific flow of bulk material from a storage container. By bulk material is meant particulate materials having particle sizes which range from powder granules to lump goods. The apparatus falls in the category of metering belt feeders. Such belt feeders comprise a conveyor belt and a funnel, or hopper, from which the material is drawn or from which the material runs onto an endless belt, and on which the material is weighed on a given part of the belt, prior to leaving the belt.

The flow of material leaving the belt is controlled by adjusting the supply of material thereto or by adjusting belt speed.

The most difficult problem associated with belt feeders is one of guiding the side-edges of the belt. This is primarily because the length of the belt conveyor generally is provided to be as short as possible, for process reasons of a technical nature. The material transported on initial parts of the belt causes changes in the geometry which provides stable belt movement in the starting position, due to which, after a time, the belt tends to wander sideways until it comes into contact with an obstruction of some kind or another. Lateral displacement of the belt, and particularly lateral displacement to such extreme positions, results in weighing errors. The problem is accentuated by the fact that a low belt tension is desired, so that the material can be weighed effectively.

It is known that this problem can be alleviated by cambering the drive roller and by providing the roller with a high friction surface. Soiling of the belt and changes in belt properties due to changes in temperature and also to wear, necessitate constant monitoring of the conveyor belt.

Also known to the art are mechanisms which influence lateral distribution of belt tension in an attempt to compensate for wandering of the belt. Such mechanisms are complicated and become soiled or dirty and therefore require constant inspection.

With the intention of reducing belt tension over that part of the belt which moves over the weighing path, it is known from FR-A-2 145 366 to position the belt drive means between that part of the belt onto which the material is drawn or runs out onto the belt and that section of the belt on which the material is weighed.

The position of the belt drive means presumes that the belt is caused to move over a longer, substantially horizontal plane in the weighing path than the remainder of the belt onto which the material is deposited. The belt is caused to form a loop between those planes with the aid of at least three guide rollers, the loop being so configured as to be able to draw tire material supplied to the belt down to the lower belt plane. A guide roller located at the lowest hang of the belt loop has the form of a belt-tensioning roller and one of these rollers functions to drive the belt. The tension roller imparts to the belt sufficient tension for the friction generated by the drive roller against the belt to drive the belt around the loop, and also determines the tension in that part of the belt which is located above the weighing path. These two forces produced by the tensioning roller are equally as large, and in order to prevent the belt from slipping on the drive roller, a significant degree of tension is induced in the belt, and even in the belt-section that is located over the weighing path, even though this tension is lower than the tension in that part of the belt which runs on the higher level. The fact that the transported material is caused to fall freely between the height levels means that collections of the material, and therewith coatings of material on the rollers and on the belt, will render positive function impossible with regard to belt movement and to weighing accuracy, a drawback which is particularly manifest in the case of small material flows which a low belt speed must be maintained in order to achieve weighing accuracy. The drive arrangement does not therefore provide a solution to the problem of belt control.

SUMMARY OF THE INVENTION

An object of the present invention is to eliminate the possibility of the belt of a belt feeder from wandering sideways and to reduce belt tension to almost zero over the weighing path.

In the case of the belt feeder of the invention, the belt drive location is positioned between the feed funnel and the weighing path and is constructed to guide the belt uniformly and positively. This can be achieved, for example, by perforating the edges of the belt and by using a toothed drive wheel provided with corresponding teeth and placed between the belt parts, i.e. the top and bottom runs of the belt. The teeth can also be caused to engage the perforations in the bottom run of the belt. This arrangement will therefore lock the belt against sideways movement. The belt is drawn forwards beneath the feed funnel and is moved over the weighing path. During its movement beneath the funnel, the belt will entrain the material, from the funnel and the belt will not be tensioned or made taut as it passes along the weighing path. Alternatively, the drive means may include of a drive wheel which is placed between the belt parts and which is provided with a lateral shoulder or abutment which guides the edges of the belt. The arrangement may also include a pressure means in the form of a spring-loaded wheel which functions to urge the belt against the drive wheel, the drive wheel having a high friction surface around the circumference thereof.

The material is preferably weighed by successively taking-up the load over the weighing path by a load measuring sensor or transducer along the weighing path, with maximum load-sensing being effected at the center of the weighing path and decreasing belt support from that center to the other end of the weighing path. This can be effected in a known manner with the aid of a load plate which is pivotally mounted at the load onfeed end and which extends along half the load measuring path and is supported by the load measuring sensor or transducer. Such an arrangement is found described, for instance, in SU-A-480 913.

Alternatively, the load measuring sensor may be supported by a transversely extending cam or freely-rotating roller mounted in the center of the weighing path, the belt hanging freely between this support and the ends of the weighing path. The material may also be weighed in a known manner with the aid of a weighing plate which extends from the center of the weighing path towards the ends thereof, such that the belt will hang freely over a shorter distance of the weighing path at each end thereof, said plate being supported by the load measuring sensor in the center of the plate. An example of one such arrangement is found described in U.S. Pat. No. 3,363,585. Because the belt tension is very low, the conveyor frame can be made relatively weak. In order to eliminate the disadvantages of a relatively weak frame, the frame can be mounted on three support points, thereby eliminating intrinsic mechanical deformation. The arrangement may also be such as to enable the whole of the frame to be withdrawn laterally, so as to simplify cleaning of the belt feeder and belt-changing operations.

BRIEF DESCRIPTION OF THE DRAWINGS

FIG. 8 is a schematic side elevation view of a complete belt feeder and frame embodying principles of the present invention;

FIG. 9 is a top plan view thereof; and

FIG. 10 is a transverse vertical sectional view thereof on line 58–59 of FIG. 9.

The invention will now be described with reference to FIGS. 1–10.

Figure 1:
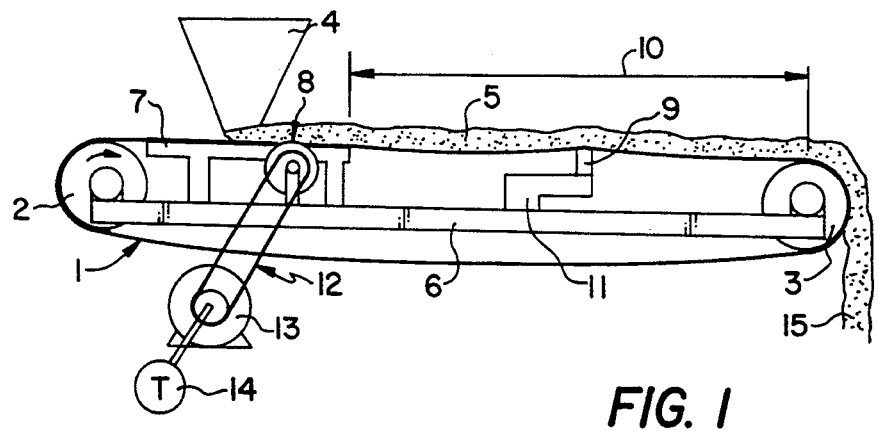
FIG. 1 is a schematic side elevation view of a metering belt feeder embodying principles of the present invention.

FIG. 1 illustrates the principle construction of the arrangement. The conveyor belt 1 of the illustrated metering feeder is positioned between the rollers 2 and 3. A feed funnel 4 is mounted at one end of the feeder. The illustrated funnel is constructed for metering material 5 whose properties enable it to run gravitationally onto the belt. In other cases, the funnel is constructed so that a column of material will form on the belt and be drawn from the funnel over the belt. The rollers 2 and 3 are journalled at the ends of the frame 6. Also connected to the frame is a belt support plate 7. In the illustrated arrangement, a belt drive means 8 is mounted on the right of the funnel. In the illustrated case, the drive means has the form of a wheel, but is constructed in a manner to drive the belt in a uniform direction in the absence of belt sliding and in a manner to hold the belt against sideways movement. Alternative embodiments are illustrated in remaining figures of the drawings.

The support plate 7 extends slightly beyond the drive means in the belt parts direction, so as to leave the belt hanging freely up to the location of a cam 9 which extends transversely across the belt and which is the sole belt support up to the roller 3. The cam is instrumental in the measuring of the weight of the material on the belt and the weight of the belt along the weighing path 10. These weights are measured by a load-measuring sensor or transducer 11, which is preferably a resistive or magnetic type sensor.

The frame 6 is placed on a supporting surface (not shown). The drive means 8 is rotated via the drive belt 12 driven by a motor provided with a suitable gearbox 13. The rotational speed of the motor constitutes a measurement of belt speed and is measured by a tachometer 14. A control signal for the rotational speed of the motor is produced electronically with the aid of the weight signal produced by the load measuring sensor and also the belt speed. This enables the flow 15 of material from the belt feeder to be measured and controlled in a known manner, for example so as to achieve constant flow with time or to control the flow to a given magnitude with the aid of an external control signal.

Figure 2:
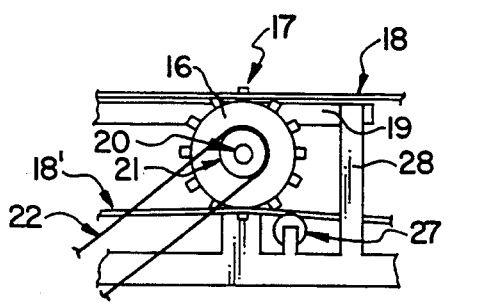
FIG. 2 is a larger scale fragmentary side elevational view of the front specific embodiment thereof.
Figure 3:
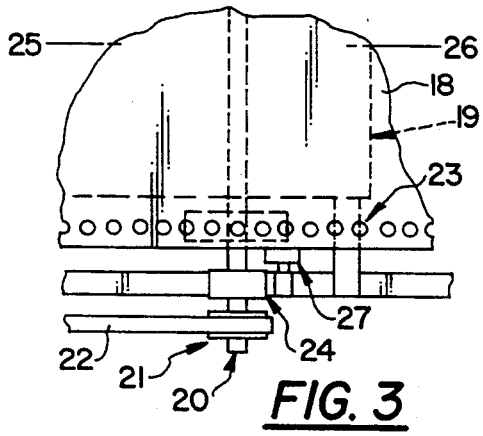
FIG. 3 is a fragmentary top plan view thereof.

FIGS. 2 and 3 illustrate an embodiment of the drive means 8 shown in FIG. 1. FIG. 2 is a side view of the arrangement and FIG. 3 shows the belt from above, solely at the right-hand belt edge. The drive wheel 16 is provided with a number of teeth 17 which engage in perforations or holes 23 (shown in FIG. 3), and the circumference of the wheel is positioned so as to be level with the underside of the belt 18, which is also supported by the support plate 19. The wheel 21 is mounted on the shaft 20 and is driven by the drive belt 22.

The FIG. 3 embodiment includes a bearing housing 24 for the drive shaft 20 and a number of holes 23, which conform to the teeth 17 with respect to size and hole spacing. Guiding of the belt can be improved by also mounting a drive wheel 16 on the shaft at the other edge of the belt, on the other side of the symmetry line 25–26, this edge also being provided with corresponding perforations or holes. With the intention of further improving guiding of the belt, the return side or bottom run 18' of the belt can be raised by means of a transversal arm 27 attached to the frame 28 such that the teeth 17 on the drive wheel are also caused to engage in the holes or perforations 23.

Figure 4:
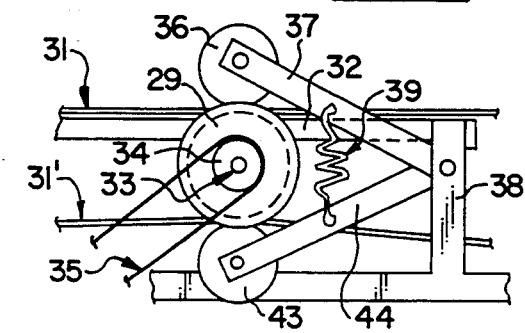
FIG. 4 is a fragmentary side elevation view of the second embodiment thereof.
Figure 5:
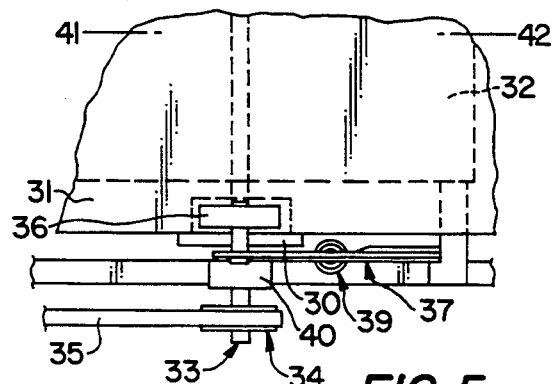
FIG. 5 is a fragmentary top plan view of the second embodiment.

FIGS. 4 and 5 illustrate an alternative embodiment of the drive means 8 shown in FIG. 1. FIG. 4 is a side view of the arrangement and FIG. 4 shows the belt from above and solely at the right-hand belt edge. The drive wheel 29 is provided with a flange 30 (shown in FIG. 5), and the wheel periphery is positioned so as to be level with the underside of the belt 31, which is also supported by the support plate 32. The wheel 34 is mounted on the shaft 33 and driven by the drive belt 35. Mounted on the upper side of the belt 31 is a freely-rotating wheel 36, which is journalled on an arm 37, the other end of which is journalled to the frame 38. The wheel 36 functions to press the belt against the drive wheel 29, with the aid of the spring 39. The flange 30 on the drive wheel 29 prevents the belt from wandering in a sideways direction. The drive wheel 29 is suitably provided with a surface which provides a high degree of friction with the belt surface.

Also shown in FIG. 5 is a bearing housing for the shaft 33. The mechanism can be improved by mounting a drive wheel 29 on the other edge of the belt, on the other side of the symmetry line 41–42, and a wheel 36 which functions to press against the upper side of the belt can also be provided on this other edge of the belt. In the case of the illustrated embodiment, the flanges 30 prevent the belt from wandering to one side or the other. This belt guide can be further improved by providing a freely-rotating wheel 43 which functions to press the return side or bottom run 31' of the belt against the underside of the drive wheel 29, the wheel 33 being journalled on an arm 44 whose other end is journalled to the frame 38 and also connected to the spring 39.

Figure 6:
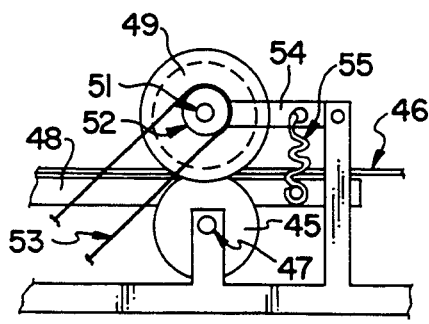
FIG. 6 is a fragmentary side elevation view of a third embodiment thereof.
Figure 7:
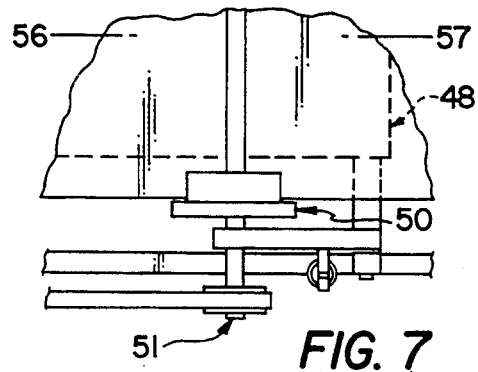
FIG. 7 is a fragmentary top plan view of the third embodiment.

A drive means 8, shown in FIG. 1, constructed in accordance with FIGS. 6 and 7, may be suitable for certain feeder constructions. FIG. 6 is a side view of the belt and FIG. 7 illustrates the belt from above and at the right-hand edge of the belt. The wheel 45 mounted between the top and bottom runs of the belt is positioned level with the underside of the belt 46 and runs freely on the shaft 47. The belt 46 is also supported by the support plate 48. Mounted above the wheel 45 is a drive wheel 49 having a flange 50 (shown in FIG. 7), this drive wheel being mounted on the drive shaft 51, which extends transversely to the longitudinal axis of the belt. The drive shaft is, in turn, driven by the wheel 52 and the drive belt 53. The shaft 51 is journalled on the arm 54 which, with the aid of the spring 55, presses the wheel 49 against the upper side of the belt.

As will be seen from FIG. 7, the flange 50 restrains the belt against sideways movement, and a corresponding mechanism is provided at the other edge of the belt, on the other side of the symmetry line 56–57, the flanges 50 preventing the belt from wandering to one side or the other.

FIGS. 8–10 illustrate a complete belt feeder and frame. FIG. 8 is a side view and FIG. 9 a view taken from above. FIG. 10 illustrates a section taken transversely across the feeder on line 58–59 of FIG. 9.

The belt 60 is shown positioned between the rollers 61 and 62. The roller shafts are mounted in recesses 63 so as to enable adjustments to be made to these shafts with the aid of setting screws 64 at the respective ends of the frame 65. The frame 65 comprises two elongated profiles 66 which are mutually connected by two transverse tubes 67 provided at respective ends of the profiles. The tubes 67 are fitted over two rods 68 which extend with clearances to the tubes 67. The contact surfaces between the components 67 and 68 include two knobs 69 on the one rod 68 and a knob 70 on the right-hand rod as seen in the Figure. The frame 65 thus rests stably on three support points, thereby avoiding internal stresses resulting in warping of the frame. The rods 68 are affixed to the vertical posts 71 and the horizontal components 72 to form a frame. The feed funnel is not shown attached to the frame of the belt feeder, since the funnel often forms part of a larger storage container 74 positioned above the feeder. Drive wheels 75 are mounted on both sides of the belt, to the right of the funnel and between the belt parts. The drive wheels are provided with teeth 76 whose pitch is adapted to the pitch of the perforations or holes 77 in the belt. The return part, or bottom run, of the belt 60 is held raised by a transversal cam 78 attached to the frame 65, and the teeth 76 are also caused to engage the bottom run of the belt.

The left-hand part of the belt passing around the roller 61 can be made taut with the aid of the roller adjuster screws 64, so as to facilitate withdrawal of material from the feed funnel. The right-hand part of the belt can be caused to run with low belt tension at the same time, this being achieved by means of the adjuster screws for the roller 62. The shaft 79 is fixed to the drive wheels 75 and is journalled in the frame profile 66. The shaft is driven by the gearbox 81 and the motor 82, via a material entraining device 80. Mounted on the end of the motor is a tachometer 83 whose speed forms a measurement of belt speed. The support plate 84 extends from beneath the funnel outwardly on the right-hand side thereof, beyond the drive wheel 75, and the weighing plate 86 is pivotably mounted to the right-hand edge 85 of said plate. The weighing plate extends along about half the weighing path, i.e. along half the distance from the end 85 of the support plate to the midway point of the roller 62.

The weighing plate is supported by the load-measuring sensor 87 (shown in broken lines in FIG. 8) through the intermediary of the post 88. The other end of the sensor is attached to the frame 65 through the intermediary of a cross-beam 89 which extends between said profiles 66. The gearbox 81 with motor 82 is attached to a bracket structure 90 on the left-hand post 71.

Depending on the type of bulk materials to be weighed, a complete belt feeder will include side-spill protectors and belt cleaning scrapers. These are not shown. If the feeder needs to be encased, the motor is preferably placed outside the casing, the extension of the casing walls 91 being shown in broken lines in FIG. 10. When the funnel 73 is attached to the upper side of the casing and the vertical casing wall shown to the right in FIG. 10 can be removed, the whole of the feeder can be withdrawn from the right-hand end of the casing, wherewith engagement of the material entraining device 80 is released and the frame 65 slides against the knobs 69 and 70 on the rods 68. This greatly facilitates servicing of the feeder.

When the belt feeder is intended for large flow capacities or for material which has particular properties, the drive wheels 75 can be supplemented with pressure rollers 36 and 43 according to the embodiment illustrated in FIGS. 5 and 6. The frame bars 66 may also have the form of U-profiles and the attachment 89 attached to the bars 66 by means of adjuster screws, so as to enable the height of the weighing plate 86 to be adjusted.

We claim:
1. A metering belt feeder for gravimetrically measuring a flow of material, comprising:
   an endless conveyor belt entrained about end rollers so as to have a generally horizontal, upwardly presented carrying run having an upstream end and a downstream end, and an underlying return run;
   means providing a loading zone longitudinally intermediate said end rollers for loading onto said carrying run material which is to be weighed;
   means associated with said carrying run in a weighing zone located longitudinally intermediate said end rollers and downstream from said loading zone, for weighing material passing thereover on said carrying run;
   a belt drive means for longitudinally advancing said carrying run of said conveyor belt towards said downstream end, said belt drive means being effectively drivingly engaged with said carrying run of said conveyor belt at a location which is longitudinally intermediate said loading zone and said weighing zone so that said belt drive means pulls said carrying run from said loading zone and projects said carrying run towards said weighing zone;
   said belt drive means including means for preventing slipping of said belt longitudinally of said carrying run with respect to said belt drive means; and
   said belt drive means further including means engaging said conveyor belt for guiding the conveyor belt against movement transversely of said carrying run.

2. The metering belt feeder of claim 1, wherein:

said conveyor belt is provided with at least one series of perforations extending longitudinally of said carrying run, adjacent to a lateral edge of said conveyor belt; and said means preventing slipping of said belt comprising at least one toothed drive wheel drivingly engaged with respective said perforations, in said carrying run of said conveyor belt.

3. The metering belt feeder of claim 2, wherein:

said means for guiding against movement transversally comprising means maintaining each said toothed drive wheel also engaged with respective said perforations in said return run of said conveyor belt.

4. The metering belt feeder of claim 3, wherein:

said conveyor belt is provided with two said series of perforations, adjacent both laterally opposite edges of said conveyor belt; said means preventing slipping comprise two said toothed drive wheels, each being associated with a respective said series of perforations.

5. The metering belt feeder of claim 2, wherein:

said conveyor belt is provided with two said series of perforations, adjacent both laterally opposite edges of said conveyor belt; said means preventing slipping comprise two said toothed drive wheels, each being associated with a respective said series of perforations.

6. The metering belt feeder of claim 1, wherein said means preventing slipping of said belt comprises at least one driven roller disposed in rollingly driving relation with one face of said conveyor belt in said carrying run, and at least one non-driven rotatable roller disposed in rolling relation with an opposite face of said conveyor belt in said carrying run; each said driven roller being disposed in opposing relation to a respective said non-driven rotatable roller to provide a respective set of rollers; means urging one said roller in each said set towards the other said roller in each set so as to squeezingly engage the carrying run of said conveyor belt between them.

7. The metering belt feeder of claim 6, wherein:

there are two said driven rollers and two said non-driven rotatable rollers, arranged in two said sets, each said set being associated with a respective lateral edge of said conveyor belt.

8. The metering belt feeder of claim 7, wherein:

said means for guiding against movement transversally comprises flange means on said driven rollers disposed in guiding relation with respective edges of said conveyor belt.

9. The metering belt feeder of claim 8, wherein:

said driven roller is disposed between said carrying run and said return run.

10. The metering belt feeder of claim 9, wherein:

said means for guiding against movement transversally further include two non-driven rollers pressed into rolling engagement with said return run from below, each in opposition to a respective said driven roller, said flange means being disposed in guiding relation with said respective edges of said conveyor belt on both said carrying run and said return run.

11. The metering belt feeder of claim 6, wherein:

said urging means urges each said driven roller towards each respective said non-driven rotatable roller.

12. The metering belt feeder of claim 6, wherein:

said urging means urges each said non-driven rotatable roller towards each respective said driven roller.

13. The metering belt feeder of claim 1, further including:

a frame journalling said end rollers and including two cylindrical sleeves oriented transversally of said carrying run and spaced from one another longitudinally of said carrying run;

a fixed foundation including two parallel, substantially horizontal arms, each sleeved in a respective said sleeve;

means providing two upwardly projecting support points on one of said arms and one upwardly projecting support point on the other of said arms; said two support points being spaced from one another by like distances on laterally opposite sides of a longitudinal centerline of said carrying run of said conveyor belt; said frame being supported on said foundation solely on said support points.

14. The metering belt feeder of claim 13, wherein:

said two support points are located upstream of said belt driving means and said one support point is located downstream of said weighing zone.

15. A metering belt feeder for gravimetrically, measuring a flow of material, comprising:

an endless conveyor belt entrained about rollers so as to have a generally horizontal carrying run having an upwardly presented carrying surface, said rollers including a first roller engaging said belt at an upstream end of said carrying run and a second roller engaging said belt at a downstream end of said carrying run;

a loading zone juxtaposed with said carrying run and including structure for loading onto said carrying surface a flow of material to be weighed;

a weighing zone juxtaposed with said carrying run and including structure for weighing said material which has been loaded on said carrying surface in said loading zone, said weighing zone being located downstream of said loading zone between said first and second rollers;

means for supporting said carrying run between said loading and weighing zones for maintaining said carrying run substantially horizontal and for preventing said carrying run from simply hanging in tension in an inverted arch between said first and second rollers;

said endless conveyor belt having two longitudinally running, transversely opposite edge margins; and said endless conveyor belt being driven for longitudinal running, while being restrained against lateral movement, by at least one drive wheel set, each drive wheel set including at least one driven wheel which rotates about an axis which is horizontal and transverse to said carrying run, and including structure engaged with a respective said edge margin of said belt between said loading zone and said weighing zone and thereby longitudinally driving said conveyor belt and restraining against lateral movement of said belt in said carrying run.

* * * * *